Jan. 17, 1939.  H. B. CROFTON  2,143,975
PORTABLE DRILLING MACHINE
Filed July 24, 1937
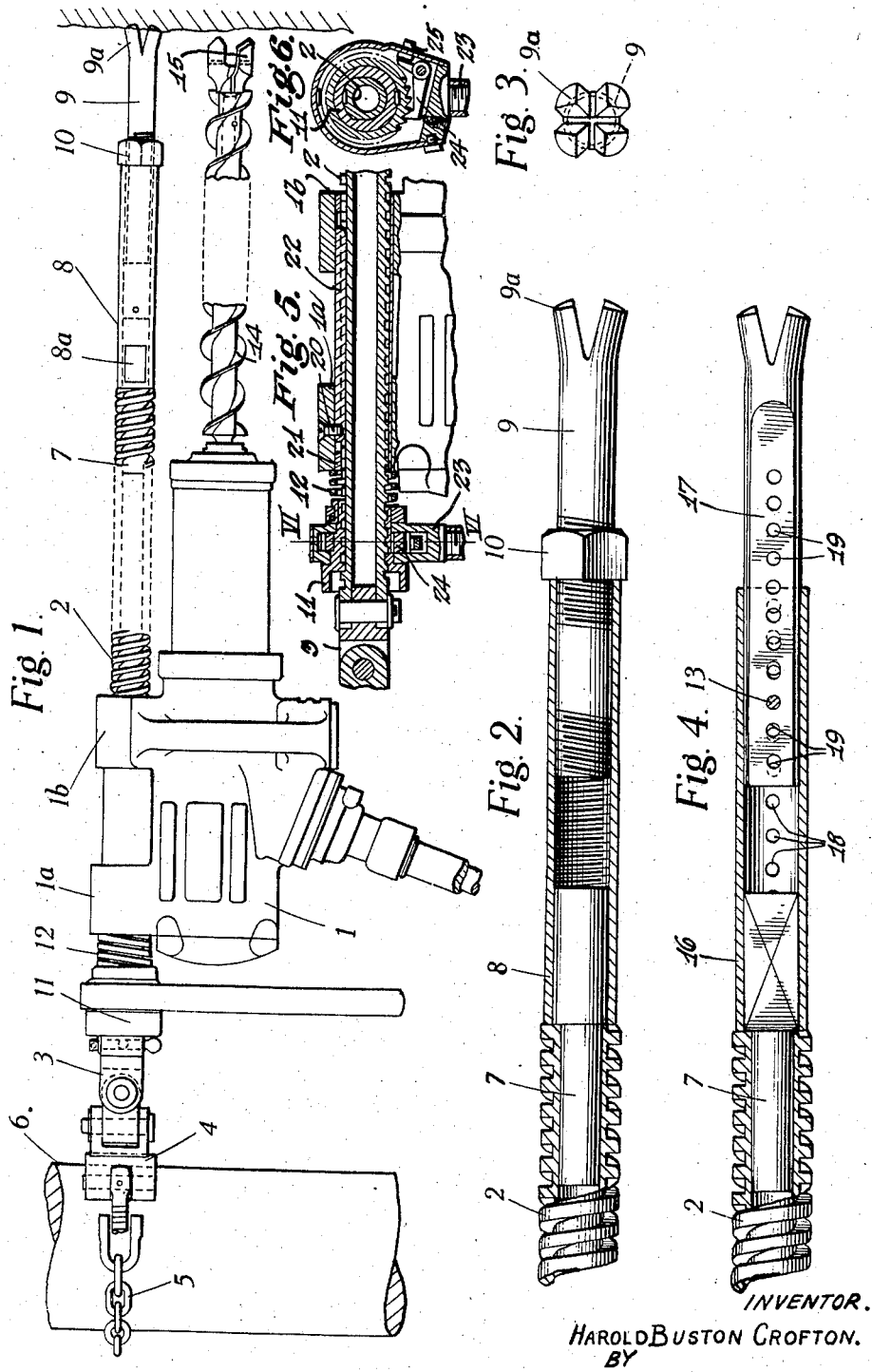
INVENTOR.
HAROLD BUSTON CROFTON.
BY
ATTORNEY.

Patented Jan. 17, 1939

2,143,975

UNITED STATES PATENT OFFICE 2,143,975

PORTABLE DRILLING MACHINE

Harold Buston Crofton, Wallsend-on-Tyne, England

Application July 24, 1937, Serial No. 155,549
In Great Britain August 11, 1936

8 Claims. (Cl. 255—51)

This invention relates to portable drilling machines of the kind in which the feed is effected by means of a feed screw engaging with a nut or nuts associated with the machine frame or casing.

Hitherto the operator had to support the drilling machine between the drill point and the abutment of the feed screw until the drilling bit has made some impression on the stone, coal or other face. While this meant that the operator was subjected to substantial stress, it also had the further drawback that where holes of different depths had to be drilled the engagement of the longer drill rod was an awkward operation often resulting in fracture of drill rods.

The object of the present invention is to provide a feed device which will take the whole weight of the drilling machine and enable it to be set in the correct position before the drilling operation is commenced. Another object of the invention is to provide means whereby the setting of the machine may be effected with greater accuracy and the operation of changing the drill rods considerably simplified.

According to the invention the feed screw has one of its ends terminating in a telescopic steady of which the member remote from the feed screw is adapted to abut against the face to be drilled, while means are preferably provided for locking the said steady in a desired position.

The invention will now be described by way of example with reference to the accompanying drawing.

In the said drawing:

Fig. 1 is an outside elevation showing a drilling machine in position ready for drilling a coal face.

Fig. 2 is a longitudinal section to an enlarged scale of the telescopic steady.

Fig. 3 is an end view of the outer end of the steady.

Fig. 4 is a similar view to Fig. 2 of an alternative form of steady.

Fig. 5 is a fragmentary longitudinal section showing the feed means; and

Fig. 6 is a fragmentary cross section taken on the line VI—VI of Fig. 5.

Referring more particularly to the drawing, 1 is the drilling machine which is suspended by means of lugs 1a, 1b integral with its casing from a hollow feed screw 2. The one end of the feed screw 2 is connected by a universal joint 3 to an abutment member 4 which is adapted to be secured by a chain 5 to a prop 6.

The other end of the feed screw 2 is adapted to pass over a reduced portion of a guide rod or plug 7 which is rigid with an extension sleeve 8, so that a coaxial abutment is formed between the feed screw 2 and the sleeve 8, the said extension sleeve being internally threaded for engagement with a correspondingly threaded abutment bar 9 having its outer end split to form a four-prong claw 9a for engagement with the coal face. A locking nut 10 is provided on the abutment bar 9 for locking the sleeve 8 and bar 9 after the desired adjustment has been made. Flats 8a are formed on the sleeve 8 for engagement with a spanner for effecting a final tightening after the machine has been placed in position. The members 7 to 10 comprise the steady unit.

Passing through the lug 1a is a clamping screw 20 (Fig. 5) which also passes through a tube 21 arranged between the lugs 1a, 1b, and engages a key 22 which is a sliding fit in a keyway formed in the feed screw 2, and in a slot formed in the tube 21.

Feeding of the drilling machine is effected by turning the ratchet nut 11 by means of the ratchet handle 23, which nut 11 is in threaded engagement with the feed screw 2 and presses through a spring 12 against the lug 1a on the casing of the machine 1.

In use, when it is desired to place the drilling machine in position, the abutment 4 is placed at the approximate desired height on the prop 6. The machine is swung into a horizontal position, and when the drilling bit is opposite the point where it is desired to drill the hole, the steady is expanded by turning the bar 9 relatively to the sleeve 8 until the claw 9a abuts against the coal face. When it is no longer possible to turn the bar 9 by hand, a final tightening is effected by applying a spanner to the flats 8a on the sleeve 8. When the machine is held rigidly in position, the locking nut 10 is tightened against the end of the sleeve 8. The machine is then ready for operation.

When a deep hole has to be drilled, the longest drill rod and bit possible to be inserted—14 and 15 indicating generally the drilling rod and bit respectively—in the confined space is first inserted in the machine, and when the maximum length of hole has been drilled, the machine is released from the drill rod and swung upwards out of the line of direction of the drill rod which remains in the hole. The drill rod is then withdrawn from the hole and a longer drill rod inserted therein. The drilling machine is moved backwards until its chuck is in the right longitudinal position for engaging the longer drill rod. This backward movement of the machine is effected by first diengaging the pawl 24 from the ratchet nut 11 by pressing the pawl release button 25 (Fig. 6), and then turning the nut 11 in the opposite direction to its feeding direction. The machine is then swung down into position and made to engage the drill rod. The second drilling operation is then commenced. These operations may be repeated according to the depth of hole required, the maximum depth which can be drilled depending upon the length of drill which it is possible to insert in the hole under the confined conditions of working.

It will be seen that with the machine according to the present invention, the operator is relieved of all stress so that he is able to work with greater efficiency; while owing to the machine being capable of being swung out of position when it is desired to change the drill rod, less time is occupied in carrying out a set of operations and the efficiency of the machine is thus further increased.

According to the alternative form of the invention shown in Fig. 4, the sleeve 16 and bar 17 are plain and of square or other non-circular section and are slidable axially relatively to one another, holes 18, 19 of different spacing being respectively formed in each member to give a vernier effect, so that when the sleeve and bar are in the desired position a pin 13 may be passed through a coinciding pair of holes.

I claim:

1. In a portable drilling machine of the kind described, a casing, lugs on said casing, a feed screw passing through said lugs, a telescopic steady engaging in axial alignment with said feed screw, the member of said steady remote from the feed screw being adapted to abut against the face to be drilled.

2. In a portable drilling machine according to claim 1, means for locking the steady in a desired position.

3. In a portable drilling machine according to claim 1, the construction wherein the telescopic steady comprises an internally threaded sleeve adapted to engage on one end of the feed screw and an externally threaded abutment bar engaging with said threaded sleeve.

4. In a portable drilling machine according to claim 1 the construction wherein the telescopic steady comprises an internally threaded sleeve adapted to engage on one end of the feed screw, an externally threaded abutment bar engaging with said threaded sleeve and a lock nut on said abutment bar for locking the said sleeve and bar in a desired position.

5. In a portable drilling machine according to claim 1, the construction wherein the telescopic steady comprises a sleeve adapted to engage on one end of the feed screw, an abutment bar slidable relatively to said sleeve, and means for locking said sleeve and abutment bar in a desired position.

6. In a portable drilling machine according to claim 1, the construction wherein the telescopic steady comprises a sleeve adapted to engage on one end of the feed screw, an abutment bar slidable relatively to said sleeve, holes of differing spacing being formed in said sleeve and bar to give a vernier effect, so that when the sleeve and bar are in the desired position a pin may be passed through a coinciding pair of holes.

7. A detachable steadying member for use in connection with the feed screw of a portable drilling machine of the kind described comprising a telescopic member the one end of one element of which comprises one member of a plug and socket abutment between itself and the one end of the feed screw so that the steadying member abuts coaxially against the said end of the feed screw, while the other element is adapted to abut against the face to be drilled.

8. A detachable steadying member according to claim 7 wherein the telescopic member comprises an internally threaded sleeve a plug in the one end of said sleeve, said plug being adapted to engage in one end of the feedscrew of the drilling machine and an externally threaded abutment bar engaging with said threaded sleeve.

HAROLD BUSTON CROFTON.